Jan. 14, 1936.　　　　H. L. BRUCE　　　　2,027,899
COVER FOR RECEPTACLES FOR SAFETY RAZORS
Original Filed May 2, 1932
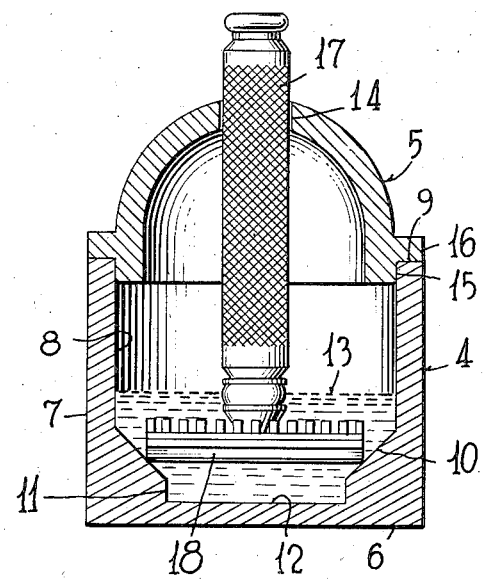
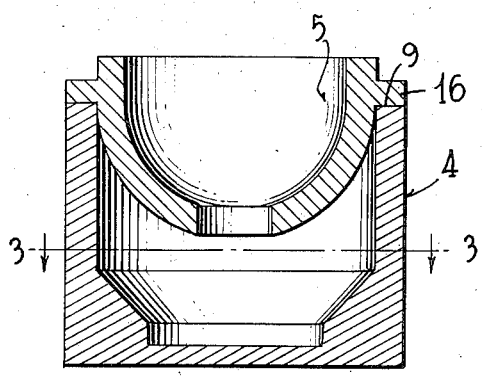
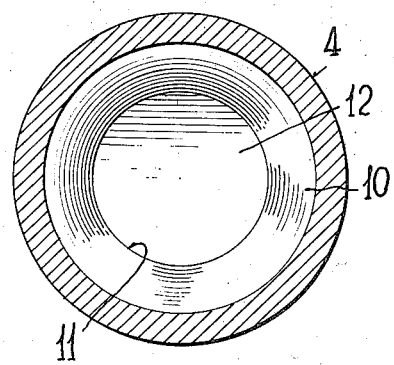
Inventor
Homer L. Bruce,
By Barry & Cyr
Attorneys Patented Jan. 14, 1936

2,027,899

UNITED STATES PATENT OFFICE 2,027,899

COVER FOR RECEPTACLES FOR SAFETY RAZORS

Homer L. Bruce, Houston, Tex.

Original application May 2, 1932, Serial No. 608,812. Divided and this application November 26, 1934, Serial No. 754,921

1 Claim. (Cl. 206—16)

This invention relates to improvements in receptacles for safety razors and metallic instruments or articles which are to be kept immersed in solutions for cleaning, sterilizing, rust prevention, and similar purposes, and the present application is a division of my application Serial No. 608,812, filed May 2, 1932, Patent No. 1,981,853.

An object of the invention is to furnish a receptacle for these purposes, having a lid through which the handle of the razor may extend, and adapted to hold the razor upright. The lid is of such shape that it may be easily and firmly grasped when being placed on or removed from the body of the receptacle, and which will snugly fit the latter when in use.

Another object is to supply a lid of such shape that, when it is desired to pack the receptacle and carry it from one place to another, the lid may be placed in inverted position on the body with the two pieces forming a compact unit, and with the major portion of the lid occupying a position within the body, thus reducing the space required for the receptacle and rendering the same less liable to breakage.

With the foregoing objects outlined and with other objects in view which will appear as the description proceeds, the invention consists in the novel features hereinafter described in detail, illustrated in the accompanying drawing, and more particularly pointed out in the appended claim.

In the drawing,

Fig. 1 is a vertical sectional view of my improved receptacle with one type of safety razor in use with the same.

Fig. 2 is a similar view illustrating the position of the parts when they are to be packed or transported.

Fig. 3 is a horizontal sectional view on the line 3—3 of Fig. 2.

Referring to the drawing, it will be noted that the receptacle preferably consists of two parts only, a body 4, and a lid 5, both of which may be made of pottery, opal ware or any other suitable impervious material. The receptacle may be circular, square or of any other suitable shape in cross section, but I prefer the circular shape, as it is more economical, both as to the material used and the solution needed.

In the embodiment of the invention illustrated, the body 4 has a flat base 6 for the purpose of supporting the receptacle in an upstanding position on any substantially horizontal supporting surface. An annular wall 7 rises from the bottom and its inner surface is of cylindrical shape, as shown at 8, from its upper edge 9 to the top of a sloping surface 10. This surface is preferably of inverted frusto-conical shape, and it merges at its lower end into the upper end of a cylindrical surface 11 that provides a flat bottomed well 12 within the body.

In use, the body contains a solution 13 that prevents rusting, sterilizes and also softens and cuts away from the blade, soap and other foreign substances adhering thereto after a shave.

The lid forming the subject matter of the present invention is preferably of dome shape with an opening 14 at its top. The lower portion of the dome has a cylindrical outer surface 15 to snugly engage the surface 8, when the parts are assembled, and intermediate the height of the dome there is an annular flange 16 which rests on the edge 9 of the body.

17 designates the handle, and 18 the guard and blade portion of a conventional safety razor of the double-edged type, and it will be noted that when such a razor is used with the receptacle, the parts 18 have their end edges resting on the sloping surface 10 above the well 12, and these parts are held in this position due to the fact that the opening 14 supports the handle 17 in an upright or vertical position.

With regard to the use of such a device, it is well known that the average man dislikes to take his safety razor apart and clean it when he is through shaving. Also, the edge of the best of blades, if left exposed to the air, accumulates more or less rust. Even a very small amount of rust will cause a blade to lose its edge more rapidly than if rusting were prevented.

In accordance with the invention, I provide a conveniently shaped receptacle in which is kept the solution 13 that prevents rusting and sterilizes, and which also softens and cuts away from the blade, soap or the like. When the shave is over, the razor is moved back and forth a few times in the water in the wash basin to remove the major portion of the soap, etc., and then the razor is placed in my receptacle, as illustrated in Fig. 1. The next morning, it is taken out of the receptacle, moved back and forth in water once or twice to remove the solution, and is then ready for shaving.

For the purpose of packing or transporting the device, it is desirable that it be in compact form, and for this purpose, I make the dome of the cover of less diameter than the cylindrical surface 8, whereby the cover or lid can be inverted and inserted into the body 4 until the flange 16 comes to rest on the edge 9, as shown in Fig. 2.

It will be noted that the aperture 14 is of such size as to loosely receive the razor handle 17 and as the lower end of the lid 5 simply fits in the upper end of the receptacle, the lid may readily and quickly be detached by simply lifting it upwardly off of the receptacle and razor handle. Of course, it may be replaced with equal facility. Furthermore, as the flange 16 is located near the lower end of the lid, the substantially dome-shaped, relatively high portion of the lid above the flange may be used as a handle in removing or replacing the lid. Moreover, as the substantially dome-shaped portion of the lid projects a considerable distance above the flange 16, the aperture 14 is placed relatively high where it will steady the upper end portion of the handle and prevent the latter from wobbling.

From the foregoing it is believed that the construction, operation and advantages of the device may be readily understood by those skilled in the art, and I am aware that changes may be made in the details disclosed, without departing from the spirit of the invention, as expressed in the claim.

What is claimed and desired to be secured by Letters Patent is:

A detachable lid for a safety razor receptacle or the like, comprising a hollow substantially dome-shaped rigid body having an aperture in its top of such a size as to loosely receive and support a safety razor handle or the like, said lid having an external flange positioned near its lower end and spaced a relatively great distance below its upper end to permit the portion of the lid above the flange to provide a handle for the lid, each of the portions of the lid immediately above and below the flange being of substantially identical size and shape to fit within a hollow body of a safety razor receptacle.

HOMER L. BRUCE.